US011247307B2

(12) United States Patent
Kollias

(10) Patent No.: US 11,247,307 B2
(45) Date of Patent: Feb. 15, 2022

(54) MODULAR, CAM LOCKED SOFT JAW FOR HOLDING WORKPIECES SECURELY AND ACCURATELY IN A MACHINE TOOL

(71) Applicant: James A. Kollias, Cedar Rapids, IA (US)

(72) Inventor: James A. Kollias, Cedar Rapids, IA (US)

(*) Notice: Subject to any disclaimer, the term of this patent is extended or adjusted under 35 U.S.C. 154(b) by 137 days.

(21) Appl. No.: 16/570,491

(22) Filed: Sep. 13, 2019

(65) Prior Publication Data

US 2020/0086460 A1 Mar. 19, 2020

Related U.S. Application Data

(60) Provisional application No. 62/730,835, filed on Sep. 13, 2018, provisional application No. 62/730,857, filed on Sep. 13, 2018.

(51) Int. Cl.
*B25B 5/08* (2006.01)
*B25B 5/16* (2006.01)
*B25B 5/10* (2006.01)

(52) U.S. Cl.
CPC .............. *B25B 5/08* (2013.01); *B25B 5/163* (2013.01); *B25B 5/166* (2013.01); *B25B 5/10* (2013.01)

(58) Field of Classification Search
CPC ... B23Q 3/00; B23Q 3/02; B23Q 3/06; B23Q 3/061; B23Q 3/066; B23Q 3/102; B23Q 1/42; B23Q 1/28; B23Q 1/25; B23Q 16/00; B23Q 16/001; B25B 1/08; B25B 1/10; B25B 1/103; B25B 1/2405; B25B 1/2484; B25B 5/08; B25B 5/087; B25B 5/10;

(Continued)

(56) References Cited

U.S. PATENT DOCUMENTS 4,804,171 A * 2/1989 Dornfeld .................. B25B 1/08
269/138
6,126,158 A * 10/2000 Engibarov ................ B25B 5/08
269/101

(Continued)

OTHER PUBLICATIONS

Wikipedia Screws, 2018, (https://en.wikipedia.org/wiki/Screw) (Year: 2018).*

*Primary Examiner* — Lee D Wilson
*Assistant Examiner* — Robert F Neibaur
(74) *Attorney, Agent, or Firm* — McKee, Voorhees & Sease, PLC

(57) ABSTRACT

The present invention relates to a clamping mechanism that is configured to securely hold a workpiece in a machine tool, such as, but not limited to a vertical machining center, or a horizontal machining center, etc. More specifically, the clamping mechanism is configured as a modular soft jaw. A multiplicity of clamping mechanisms can be used to cooperatively secure large workpieces. Furthermore, a multiplicity of clamping mechanisms can be incorporated into a job set-up so a multiplicity of workpieces can be processed concurrently. The present invention's clamping mechanism can be secured in orientations such as, but not limited to a machine tool table bed, a fixture plate, a tombstone, etc. The present invention's modular, soft jaw clamping mechanism can be used in conjunction with other work holding equipment, such as, but not limited to jigs, fixtures, tools, vises, clamps, etc.

17 Claims, 12 Drawing Sheets

(58) Field of Classification Search
CPC ......... B25B 5/003; B25B 5/122; B25B 1/163; B25B 1/166
USPC ........................ 269/229, 37, 35, 291, 289 R
See application file for complete search history.

(56) References Cited

U.S. PATENT DOCUMENTS

| | | | | |
|---|---|---|---|---|
| 6,126,159 | A * | 10/2000 | Dornfeld | B25B 5/08 269/138 |
| 8,550,442 | B2 * | 10/2013 | Philippe | B23Q 1/0063 269/296 |
| 9,266,222 | B2 * | 2/2016 | Cardon-Dubois | B25B 1/08 |
| 9,381,621 | B2 * | 7/2016 | Taylor | B25B 1/2405 |
| 9,895,792 | B2 * | 2/2018 | Chen | B25B 1/241 |
| 10,239,190 | B2 * | 3/2019 | Tsui | B25B 5/02 |
| 10,603,750 | B1 * | 3/2020 | Taylor | B23Q 3/103 |
| 10,808,881 | B1 * | 10/2020 | Phillips | F16B 37/041 |
| 2003/0197319 | A1 * | 10/2003 | Ho | B25B 5/08 269/246 |
| 2007/0063405 | A1 * | 3/2007 | Troxler | B23Q 3/18 269/309 |
| 2009/0184449 | A1 * | 7/2009 | Drees | F16C 11/103 269/71 |
| 2010/0181714 | A1 * | 7/2010 | Calhoun | B25B 1/241 269/283 |
| 2018/0229337 | A1 * | 8/2018 | Maurer | B23Q 3/069 |

\* cited by examiner

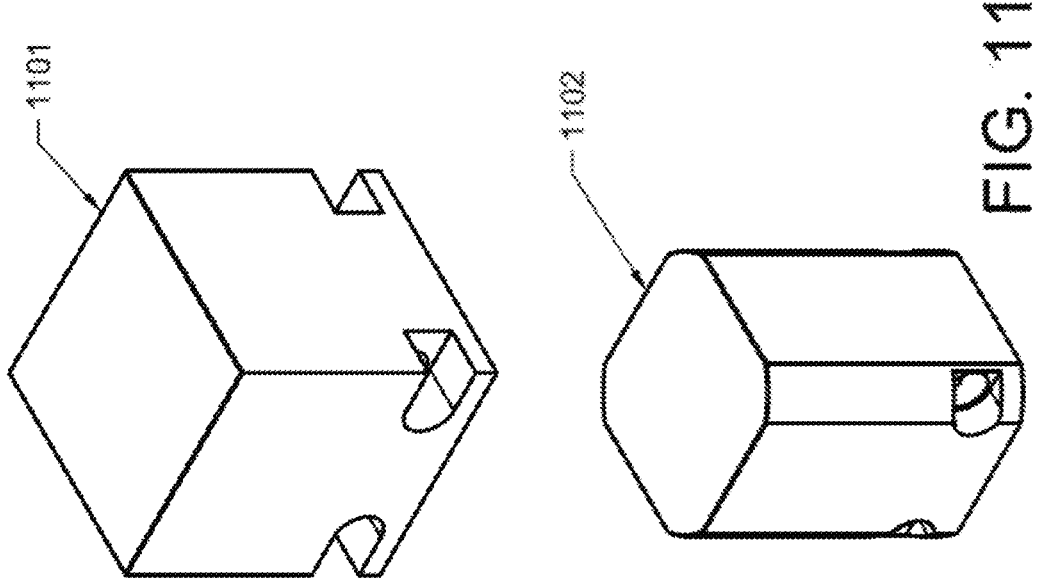
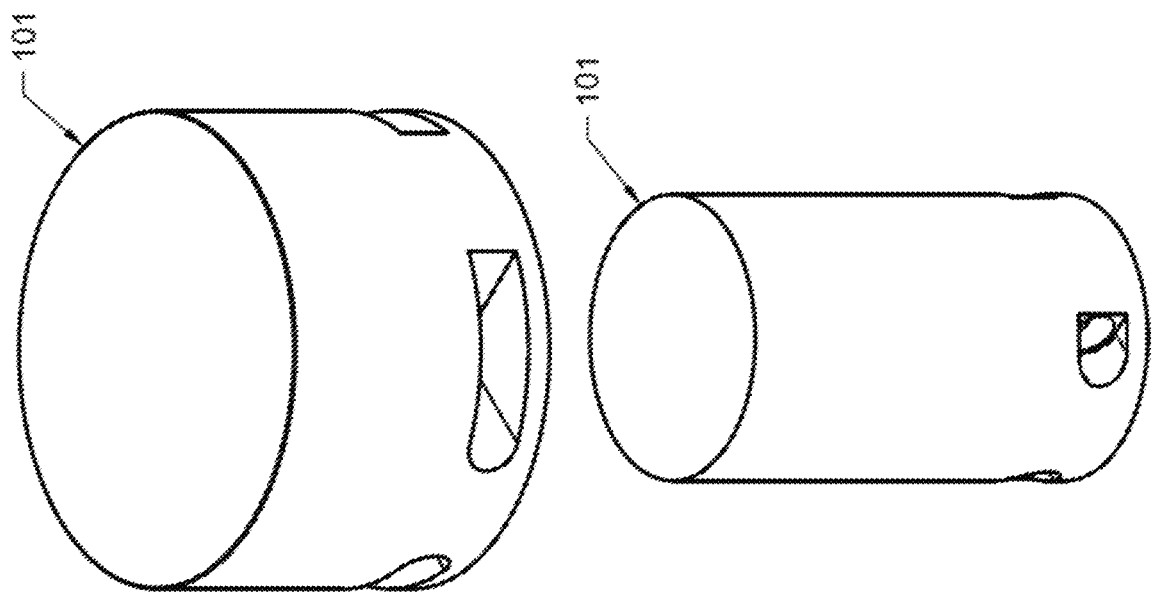
FIG. 11

MODULAR, CAM LOCKED SOFT JAW FOR HOLDING WORKPIECES SECURELY AND ACCURATELY IN A MACHINE TOOL

CROSS REFERENCE TO RELATED APPLICATIONS

This application claims priority under 35 U.S.C. § 119 to provisional patent applications U.S. Ser. No. 62/730,835, filed Sep. 13, 2018, and U.S. Ser. No. 62/730,857, filed Sep. 13, 2018. The provisional patent applications are herein incorporated by reference in their entirety, including without limitation, the specification, claims, and abstract, as well as any figures, tables, appendices, or drawings thereof.

FIELD OF THE INVENTION

The present invention relates to a clamping mechanism that is configured to securely hold a workpiece in a machine tool, such as, but not limited to a vertical machining center, or a horizontal machining center. More specifically, the clamping mechanism is configured as a modular soft jaw. A multiplicity of clamping mechanisms can be used to cooperatively secure large workpieces. Furthermore, a multiplicity of clamping mechanisms can be incorporated into a job set-up so a multiplicity of workpieces can be processed concurrently. The present invention's clamping mechanism can be secured in orientations such as, but not limited to a machine tool table bed, a fixture plate, a tombstone, etc. The present invention's modular, soft jaw clamping mechanism can be used in conjunction with other work holding equipment, such as, but not limited to jigs, fixtures, tools, vises, clamps, etc.

BACKGROUND OF THE INVENTION

During the use of a machine tool, such as, but not limited to a vertical machining center, or horizontal machining center, and other types of machine tools, the workpiece being machined must be securely held in place on the machine tool table bed, fixture plate, or tombstone, etc. This is necessary to achieve the final dimensions of a workpiece within specified machining tolerances.

The workpiece is commonly held in place relative to a machine tool by clamping it directly to the machine tool table bed, or by clamping it in a vise that is securely mounted to the machine table bed, or by clamping it in a fixture or jig that is securely mounted to the machine tool table bed, or by clamping it into a vise or clamp. Often, vises or clamps include jaws that are made of soft steel, aluminum, plastic or wood instead of hardened steel jaws. The soft jaws are easy to machine to create custom clamping surfaces that conform to at least a portion of the surface profile of the workpiece. The custom clamping surface that is machined into the soft jaw allows a workpiece to be better secured to the machine tool table bed, fixture plate, or tombstone, etc.

What is needed is a modular, soft jaw clamping mechanism that is cost-effective, readily machinable, versatile, and capable of being used in a variety of machine tools and in a variety of orientations. Furthermore, such a modular, soft jaw clamping mechanism should be configured to be securely attached to the machine tool table bed, fixture plate, or tombstone using a clamping assembly that includes a clamping insert, a single bolt and nut that are oriented parallel to the z-axis of the soft jaw portion of the assembly, and at least one clamping pin that is oriented orthogonal to the single bolt and nut. Even furthermore, what is needed is a modular, soft jaw clamping mechanism that also includes pre-drilled holes in the base portion of the soft jaw assembly that can accept at least one locator pin that is orthogonal to the base portion of the modular, soft jaw clamping mechanism assembly.

FEATURES AND OBJECTS OF THE INVENTION

It is an object of the present invention to overcome problems found in the prior art related to securely clamping a workpiece in a machine tool.

It is an object of the present invention to provide a soft jaw clamping device for securely holding a workpiece in a machine tool.

It is an object of the present invention to provide a soft jaw clamping device for securely holding a workpiece in a machine tool that can be attached to a table bed.

It is an object of the present invention to provide a soft jaw clamping device for securely holding a workpiece in a machine tool to a fixture plate.

It is an object of the present invention to provide a soft jaw clamping device for securely holding a workpiece in a machine tool to a tombstone.

It is an object of the present invention to provide a soft jaw clamping device for securely holding a workpiece in a machine tool that is modular.

It is an object of the present invention to provide a soft jaw clamping device for securely holding a workpiece in a machine tool that is easy to use.

It is an object of the present invention to provide a soft jaw clamping device for securely holding a workpiece in a machine tool that is fast to set-up.

It is an object of the present invention to provide a soft jaw clamping device for securely holding a workpiece in a machine tool that allow for accurate location in a machine tool.

It is an object of the present invention to provide a soft jaw clamping device for securely holding a workpiece in a machine tool that can be used as a workpiece stop.

It is an object of the present invention to provide a soft jaw clamping device for securely holding a workpiece in a machine tool that can be used for workpiece support.

It is an object of the present invention to provide a soft jaw clamping device for securely holding a workpiece in a machine too that can be used as a riser block.

It is an object of the present invention to provide a soft jaw clamping device for securely holding a workpiece in a machine tool that can be used as a fixture clamp mount.

It is an object of the present invention to provide a soft jaw clamping device for securely holding a workpiece in a machine tool that can be used as a workpiece mount.

It is an object of the present invention to provide a soft jaw clamping device for securely holding a workpiece in a machine tool that can be used as a miniature pallet.

It is an object of the present invention to provide a soft jaw clamping device for securely holding a workpiece in a machine tool that can be used as a $4^{th}$ axis fixture.

It is an object of the present invention to provide a soft jaw clamping device for securely holding a workpiece in a machine tool that can be used as a $4^{th}$ axis miniature pallet.

It is an object of the present invention to provide a soft jaw clamping device for securely holding a workpiece in a machine tool that can be used as a miniature vacuum table.

It is an object of the present invention to provide a soft jaw clamping device for securely holding a workpiece in a machine tool that can be used as a mounting mechanism for equipment such as, but not limited to, coordinate measuring machine arms, robotic arms, vices, or other equipment.

It is an object of the present invention to provide a soft jaw clamping device for securely holding a workpiece in a machine tool that is simple to install.

It is an object of the present invention to provide a soft jaw clamping device for securely holding a workpiece in a machine tool that can be attached to said machine tool using at least one method.

It is an object of the present invention to provide a soft jaw clamping device for securely holding a workpiece in a machine tool that is capable of accepting a variety of pads and accessories.

It is an object of the present invention to provide a soft jaw clamping device for securely holding a workpiece in a machine tool that is capable of keeping receivers on a worktable in known, repeatable locations.

It is an object of the present invention to provide a soft jaw clamping device for securely holding a workpiece in a machine tool that is capable of mounting pads to different receivers to retain and establish orientations.

It is an object of the present invention to provide a soft jaw clamping device for securely holding a workpiece in a machine tool that is capable of accessories to different receivers to retain and establish orientations.

It is an object of the present invention to provide a soft jaw clamping device for securely holding a workpiece in a machine tool that is cost-effective.

It is an object of the present invention to provide a soft jaw clamping device for securely holding a workpiece in a machine tool using a twisting cam lock.

It is an object of the present invention to provide all these features and benefits, and others that are obvious to one skilled in the art.

SUMMARY OF THE INVENTION

The present invention is an improved, cost effective, modular soft jaw assembly that is suitable for securely holding a workpiece in place in a machine tool, such as, but not limited to a vertical machining center, horizontal machining center, etc. The present invention is also known as a TableJaw™, and may be referred to as such, hereinafter.

The TableJaw assembly is comprised of three required sub-components, and several optional sub-components. The required sub-components include the body, the clamping insert, and at least one clamping pin assembly. The optional sub-components include a bolt and a nut combination that can be used to secure the TableJaw assembly to a machine tool table bed.

Additional sub-components include bolts that can be used to secure the TableJaw assembly to tapped holes in a fixture plate or tombstone.

Furthermore, the TableJaw assembly can receive locator pins to help orient the present invention with respect to the machine tool's head.

The TableJaw body is made of a material that is readily machinable, such as, but not limited to, soft steel, aluminum, plastic, wood etc. The body is normally uniform in dimension and shape throughout that cross-section that is orthogonal to the z-axis. In best practice, the body is generally circular in this cross-section. A cavity is machined into the lower base portion of the soft jaw to receive the clamping insert, and bolt head. The cavity is machined orthogonal to the z-axis, and is uniform in dimension and shape throughout the cross-section. Near the lower base portion of the body, there are two parallel holes that extend through the surfaces of the soft jaw body. Furthermore, these two parallel holes are also machined parallel to opposite edges of the clamping insert cavity that is machined into the lower base portion of the body. These two parallel holes are counter-bored on each side of the TableJaw body. The top surface of the body can be machined in order to create a cavity that conforms to at least a portion of the surface profile of the workpiece. Optionally, the body can be drilled and tapped so other clamps, such as, but not limited to a Mitee-Bite clamping product to secure the workpiece to the body of the TableJaw.

The clamping assembly components of the present invention include the clamping insert, the clamping pin assemblies, and either a bolt and nut combination, or at least one bolt that can be threaded into a tapped hole in a fixture plate or tombstone.

The clamping insert is designed to secure to the TableJaw to a machine tool table bed, a fixture plate, a tombstone, etc. In addition, the clamping insert is designed to engage the clamping pin assemblies which contact the body of the TableJaw assembly to securely lock the present invention into place.

The clamping pin assemblies are generally circular in cross-section throughout the long axis of the component. A cam shape is machined into the clamping pins. As the clamping pin assemblies are rotated the cam engages the clamping insert to create the clamping force necessary to hold the present invention solidly in place on a machine tool table bed, a fixture plate, a tombstone, etc. As the clamping pin assemblies are rotated, the bolt and nut combination that is inserted thru the clamping insert is put into tension, which creates the necessary clamping force. Alternatively, the clamping pin assemblies may engage the clamping insert which is secured to a fixture plate, tombstone, etc. using optional bolts that are screwed into tapped holes. As the clamping pin assembles are rotated and the cams engage the clamping insert, the bolts are put into tension, which helps create the necessary clamping force. The clamping pin assemblies bear down on the lower surfaces of the two parallel holes that extend through the outer surfaces of the soft jaw body near its base. The clamping pin assemblies may also include o-rings and a c-rings. The o-rings insure a tight fit is achieved, and the c-rings acts as a stop.

The optional bolt and nut combination is inserted thru the clamping insert. The bolt is of adequate length to extend thru the rails of a machine tool table bed.

The bolt engages the nut on the underside of the machine tool table bed. The nut's design includes internal threads that match the external threads of the bolt sub-component.

The bolt and nut combination fasten the clamping insert to the machine tool table bed. In addition, the bolt and nut combination are put into tension when the clamping pin assemblies are rotated into place on the clamping insert that the bolt and nut combination pass thru. The bolt head contacts the clamping insert, and the top surface of the nut contacts the bottom of the machine tool's table bed.

Optionally, at least one bolt can be threaded into at least one tapped hole on a fixture plate, a tombstone, etc. to secure the clamping insert to a machine tool table bed, a fixture plate, a tombstone, etc.

BRIEF DESCRIPTION OF THE FIGURES

FIG. 8 is an illustration of a workpiece placed in the plurality of TableJaws shown in

FIG. 7.

FIG. 11 is an illustration of alternative TableJaw bodies.

DETAILED DESCRIPTION OF THE PRESENT INVENTION

Figure 1:
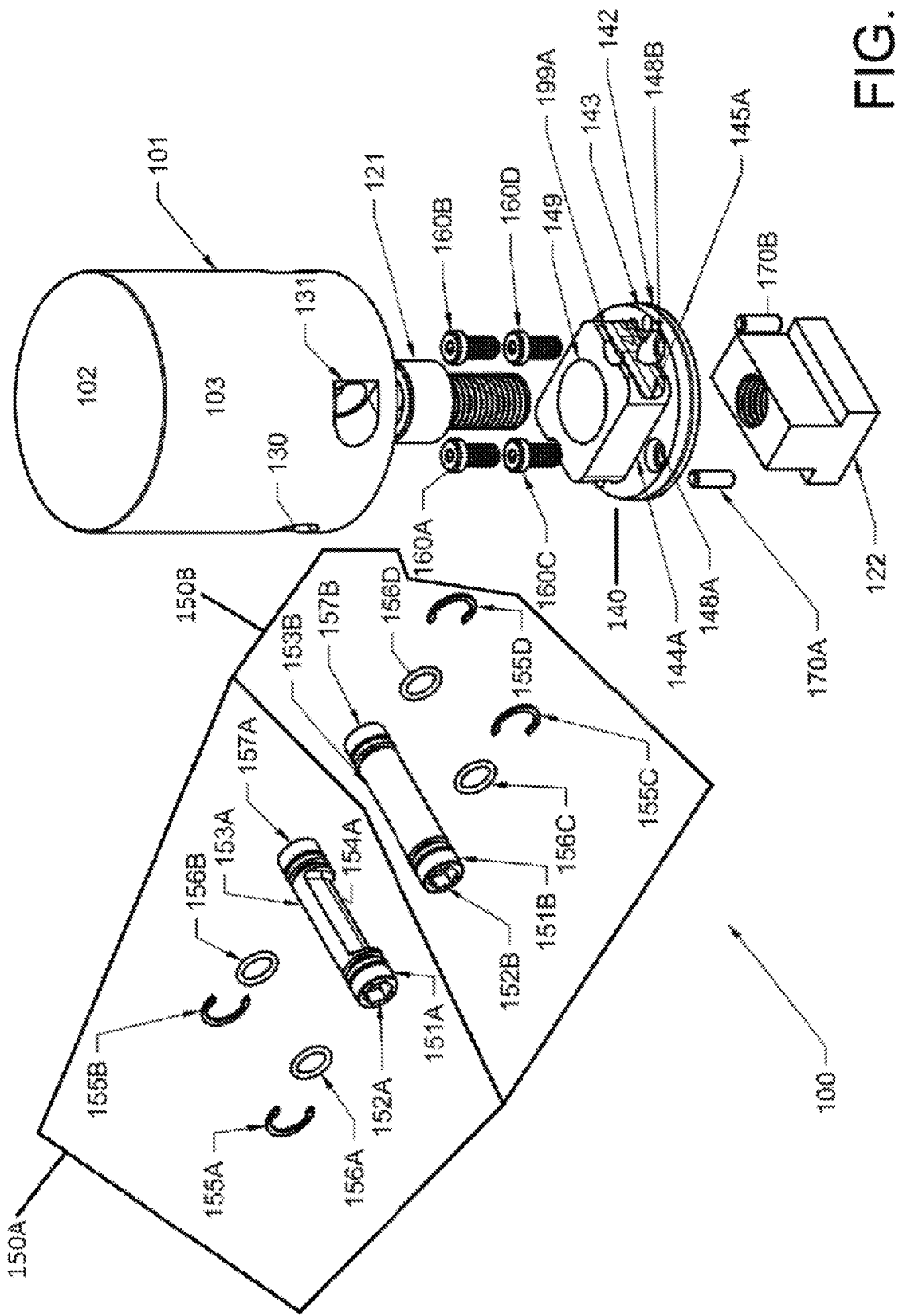
FIG. 1 is an exploded view of the present invention.

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" as used herein are not intended to refer to any single embodiment of the particular invention but encompass all possible embodiments as described in the specification and the claims.

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Terms characterizing a sequential order (e.g., first, second, etc.), a position (e.g., top, bottom, sides, forward, aft, etc.), and/or an orientation (e.g., width, length, depth, thickness, vertical, horizontal, etc.) are referenced according to the views presented. Unless context indicates otherwise, these terms are not limiting. The physical configuration of an object or combination of objects may change without departing from the scope of the present invention.

As would be apparent to one of ordinary skill in the art, mechanical, procedural, or other changes may be made without departing from the spirit and scope of the invention. The scope of the invention is defined only by the appended claims, along with the full scope of equivalents to which such claims are entitled.

The present invention's TableJaw assembly 100 is designed to be used essentially in the same manner as soft jaws are used in a traditional vice. A soft jaw is a starting point that can be modified to suit a wide variety of needs. The TableJaw body 101 is modifiable according to the user's needs, and can be drilled, tapped, machined, EDM'd, welded to, etc, in order to expand its utility. TableJaw assembly 100 is secured to the machine tool table bed, a fixture, a sub-plate, a tombstone, etc. via a rigid, fast acting mechanism, and is intended to be used as a support, stop, fastener, locator, or surface for external clamping mechanisms to be attached to, and for parts to be secured to. The present invention can be used alone, in groups, or even as a miniature pallet system. TableJaw assembly 100 is designed to operate as a "blank slate" for the user to modify to best suit their needs, but will also be provided in a variety of sizes and shapes to increase versatility and minimize end user labor.

The present invention is an improved, cost effective, modular soft jaw assembly that is suitable for securely holding a workpiece in place in a machine tool, such as, but not limited to a vertical machining center, horizontal machining center, vertical mill, horizontal mill, bridge mill, gantry mill, router, grinder, CNC lathe, CNC mill, manual lathe, manual mill, Coordinate Measuring Machine (CMM), robot arms, EDM, etc, an inspection plate, etc.

The TableJaw assembly 100 is comprised of three required sub-components, and several optional sub-components. The required sub-components include the soft jaw body 101, the clamping insert 140, and at least one clamping pin assembly 150A, B. Optional sub-components include a bolt and a nut combination 121, 122 that can be used to secure the TableJaw assembly 100 to a machine tool table bed. Additional sub-components include at least one bolt 160A, B, C, D that can be used in place of the bolt and nut combination 121, 122 to secure the TableJaw assembly 100 by threading the at least one bolt 160A, B, C, D into at least one tapped hole in a fixture plate, tombstone, etc. Furthermore, the TableJaw assembly 100 can receive locator pins 170A, B to aid in correctly and efficiently orienting the present invention with respect to the machine tool's head.

In addition to being used as a utility device for use in machining operations as described above, the TableJaw assembly 100 can be used for alternate applications such as mounting, storing, fastening components for other utilitarian uses, or any other applications that are obvious to one skilled in the art.

FIG. 1 is an exploded view of the present invention.

TableJaw body 101 is made of a material that is readily machinable, such as, but not limited to, soft steel, aluminum, plastic, wood, etc. Body 101 is normally uniform in dimension and shape throughout that cross-section that is orthogonal to the z-axis. In best practice, body 101 is generally circular in this cross-section. TableJaw body 101 includes three surfaces, the top body surface 102, the side body surface 103, and the bottom body surface 104 (not shown in this view). Top body surface 102 and bottom body surface 104 (not shown in this view) are parallel to one another, and are mutually orthogonal to the side body surface 103. Cavity 110 (not shown in this view) is machined into the bottom body surface 104 (not shown in this view) of the TableJaw assembly 100 to receive the clamping insert, and a fastener, or fastener assembly.

A fastener can be selected from the list including, but not limited to, a wood screw, machine screw, thread cutting machine screw, sheet metal screw, self-drilling sheet metal screw, hex bolt, carriage bolt, lag bolt, flange bolt, socket head screw, etc. If the fastener requires a nut, the nuts can be selected from the list including, but not limited to, a hex nut, a nylon insert lock nut, a jam nut, a nylon insert jam locking nut, a wing nut, a cap nut, an acorn nut, a flange nut, a tee nut, a square nut, a prevailing torque locking nut, a K-lock nut, a 2-way reversible lock nut, a slotted nut, a castle nut, a t-handle nut, etc. In some instances, it might be advantageous to include a washer in the fastener assembly. Washers can be selected from the list including, but not limited to, a flat washer, a fender washer, a split lock washer, an external tooth locking washer, an internal tooth locking washer, a square washer, a dock washer, a sealing washer, etc.

In FIG. 1, two types of fasteners are illustrated, a bolt and nut combination 121, 122), or bolts 160A, B, C, D. Cavity 110 (not shown in this view) is machined orthogonal to the z-axis of body 101. It should be noted that bolt 121 can be screwed into a tapped hole in a machine tool table bed (not shown in this figure or a threaded hole in a sub-plate which is not shown in the illustration) in which case the optional nut 122 is not required. It should be further noted that clamping insert 140 could be attached to a machine tool table bed (not shown in this illustration) or a sub-plate (not shown in this illustration) using an adhesive material.

Near the bottom body surface 104 (not shown in this view) of body 101, there are two parallel clamping pin receiver holes 130, 131 that extend through the side body surface 103 of body 101. Furthermore, the two parallel clamping pin receiver holes 130, 131 are machined parallel to opposite edges of cavity 110 (not shown in this view) that is machined into the bottom body surface 104 (not shown in this view) of body 101. The two parallel clamping pin receiver holes 130, 131 are counter-bored to create a flat surface that serves as a stop for the c-rings 155A, B, C, D that are part of clamping pin assembly 150A, B. It should be noted that there are counter-bores on clamping pin receiver holes 130, 131 on the opposite side of the soft jaw body (these counter-bores are visible in this view). The top body surface 102 can be machined in order to create a cavity (not shown in this view) that conforms to at least a portion of the surface profile of the workpiece (not shown in this view). Optionally, body 101 can be drilled and tapped so other clamps (not shown), such as, but not limited to a Mitee-Bite clamping product, to secure the workpiece (not shown in this view) to body 101 of the TableJaw assembly 100.

The clamping assembly components of the present invention include the clamping insert 140, the clamping pin assemblies 150A, B that include cam pins 151A, B and c-rings 155A, B, C, D and o-rings 156A, B, C, D. Other clamping assembly components include either an optional bolt and nut combination 121, 122 combination or optional bolts 160A, B, C, D.

The clamping insert 140 is made of a material that is readily machinable, such as, but not limited to, soft steel, aluminum, plastic, wood, etc. Clamping insert 140 includes surfaces bottom mounting plate surface 141 (as shown in FIG. 4), side mounting plate surface 142, top mounting plate surface 143, side upper surfaces 144A, B (144B not shown in this view), side upper locking cam surfaces 145A, B (145B not shown in this view), and top upper locking surface 146.

Figure 4:
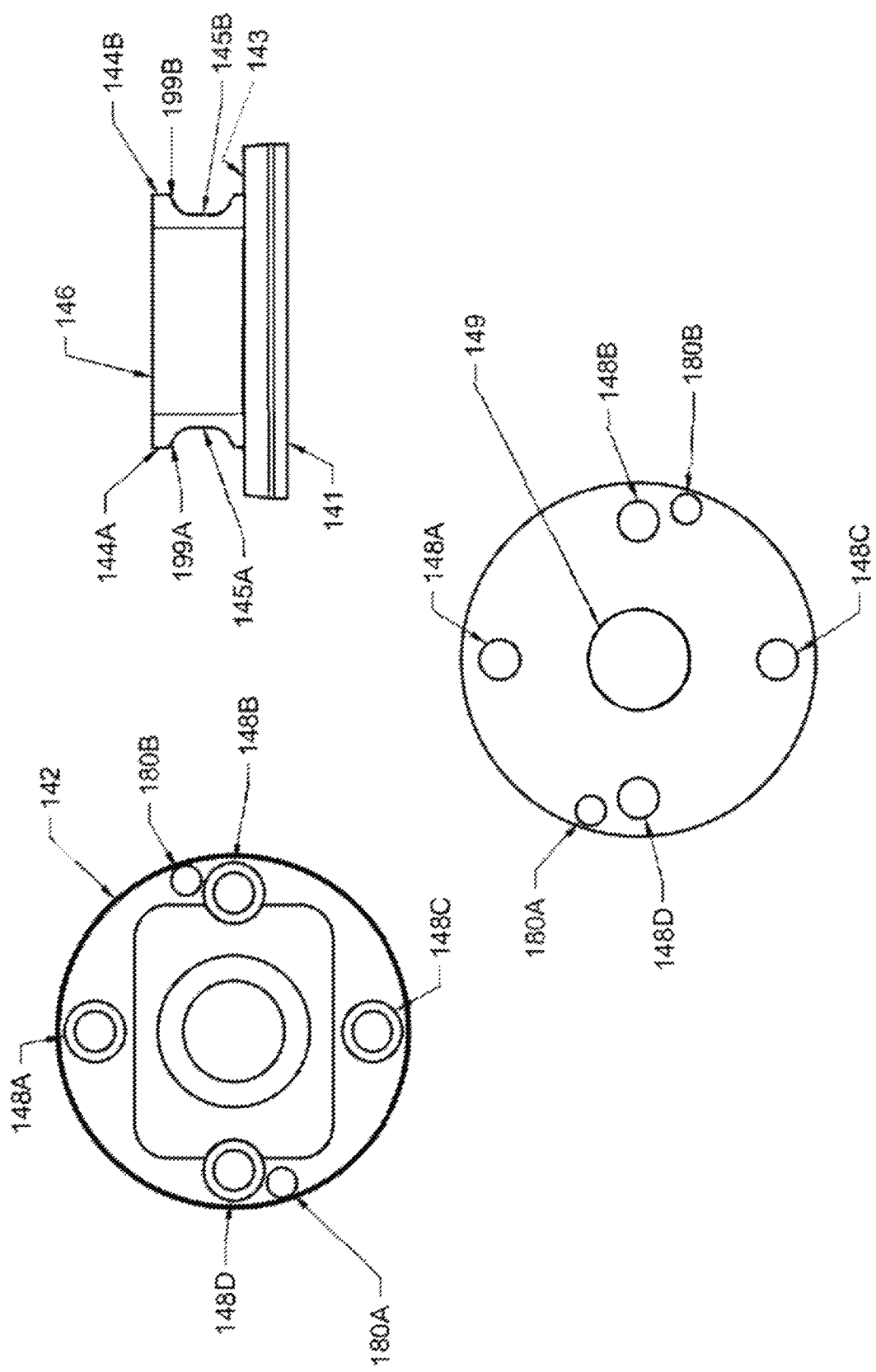
FIG. 4 is an illustration of the present invention's clamping insert.

Top mounting plate surface 143, includes thru holes 148A, B, C, D (148C, D not shown in this view) that are machined orthogonal to the top mounting plate surface 143 and bottom mounting plate surface 141 (as illustrated in FIG. 4). Thru holes 148A, B, C, D, (148C, D not shown in this view) are counter-bored, and machined 90 degrees apart radially from the center of the clamping insert 140. Thru holes 148A, B, C, D (148C, D not shown in this view) are used to engage optional bolts 160A, B, C, D. Optional bolts 160A, B, C, D securely locate and affix clamping insert 140 to a fixture plate (not shown in this view) or a tombstone (not shown in this view), etc. Center thru hole 149 is machined thru the center of the top upper locking surface 146, and is counter-bored. Center thru hole 149 is machined orthogonal to the top upper locking surface 146 and bottom mounting plate surface 141 (as illustrated in FIG. 4). The optional bolt 121 contacts the center thru hole 149 counter-bore surface in order to secure the mounting insert 140, to a machine tool table bed. The optional nut 122, which is a part of the optional bolt and nut combination 121, 122, contact the bottom side of a machine tool table bed (not shown) in order to create the necessary clamping force when tightened to securely hold TableJaw assembly 100 in place. The upper side locking cam surfaces 145A, B (145B not shown in this view) are machined with lip surfaces 199A, B (199B not shown in this view) that protrude respectively over the upper side locking cam surfaces 145A, B (145B not shown in this view). Upper lip surface 199A, B (199B not shown in this view) is designed to engage the cam shape machined into the clamping pin assembly 150A, B cam pins 151A, B.

The clamping pin assemblies 150A, B are generally circular in cross-section throughout the long axis of the assembly. Cam pins 151A, B include end cam pin surface with milled Allen wrench head 152A, B, outer cam pin surface 153A, B, cam pin cam surface 154A, B (154B not shown in this view), and end cam pin surface 157A, B. Outer cam pin surface 153A, B has grooves for o-rings 156A, B, C, D and c-rings 155A, B, C, D. It should be noted o-rings 156A, B, C, D and c-rings 155A, B, C, D are optional. It should be further noted that milled Allen wrench head 152A, B are located on both ends of cam pins 151A, B, but the opposite milled Allen wrench head 152A, B are not shown in this in FIG. 1. It sure be even further noted, that milled Allen wrench head 152A, B can be machined in a variety of configurations including, but not limited to Phillips, Freerson, slotted, combination, one way head, square star, Torx, etc. The o-rings 156A, B, C, D are provided as a convenience to keep cam pins 151A, B from moving around in the assembly. C-rings 155A, B, C, D are also optional. One c-ring on cam pins 151A, B can be used as a stop that aligns cam pins 151A, B in the proper relationship with regard to clamping insert 140 to achieve a positive cam lock without manually adjusting the position of cam pin 151A, B. The o-ring grooves and c-ring grooves are machined orthogonally to the long-axis of cam pin assemblies 150A, B. As cam pins 151A, B are rotated the cam pin cam surface 154A, B (154B not shown in this view) engage the upper lip surface 199A, B (199B not shown in this view) that respectively protrude over the upper side locking cam surfaces 145A, B (145B not shown in this view). When the cam pin cam surface 154A, B (154B not shown in this view) is locked into place, the necessary clamping force is created to hold the present invention solidly in place on a machine tool table bed (not shown in this view), a fixture plate (not shown in this view), or a tombstone (not shown in this view), etc. As the clamping pins 151A, B are rotated, the bolt and nut combination 121, 122 is inserted thru the clamping insert 140 is put into tension, which also helps create the necessary clamping force to securely locate the TableJaw assembly 100 to the machine tool table bed (not shown in this view). The clamping pin assemblies 150A, B bear down on the lower surfaces of the two parallel clamping pin receiver holes 130, 131 that extend through side body surface 103 of the soft jaw body 101 near the bottom body surface 104.

Optionally, locator pins 170A, B may be driven into locator pin holes 180A, B (as illustrated in FIG. 4) that are machined into the mounting plate portion of the clamping insert 140. The locator pin holes 180A, B (as illustrated in FIG. 4) are machined orthogonally to top mounting plate surface 143 and bottom mounting plate surface 141 (as illustrated in FIG. 4).

Figure 2:
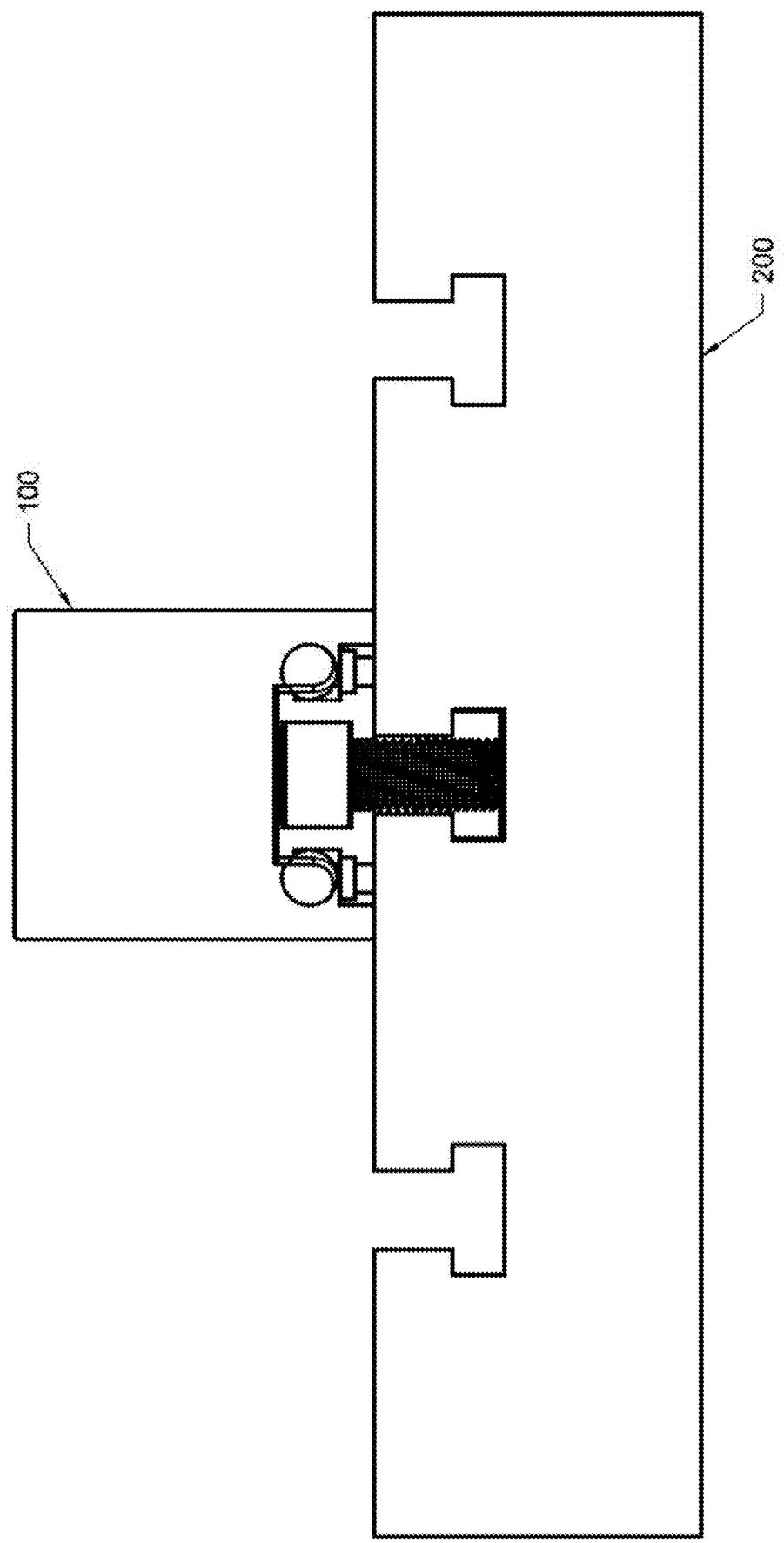
FIG. 2 is a cutaway view of the present invention mounted on a machine tool table bed.

FIG. 2 is a cutaway view of the present invention mounted on a machine tool table bed.

TableJaw assembly 100 is shown secured on machine tool table bed 200, which is configured as a common t-slot table type. The TableJaw assembly 100 is secured to machine tool table bed 200 using optional bolt and nut combination 121, 122 (nut not shown in this view).

Figure 3:
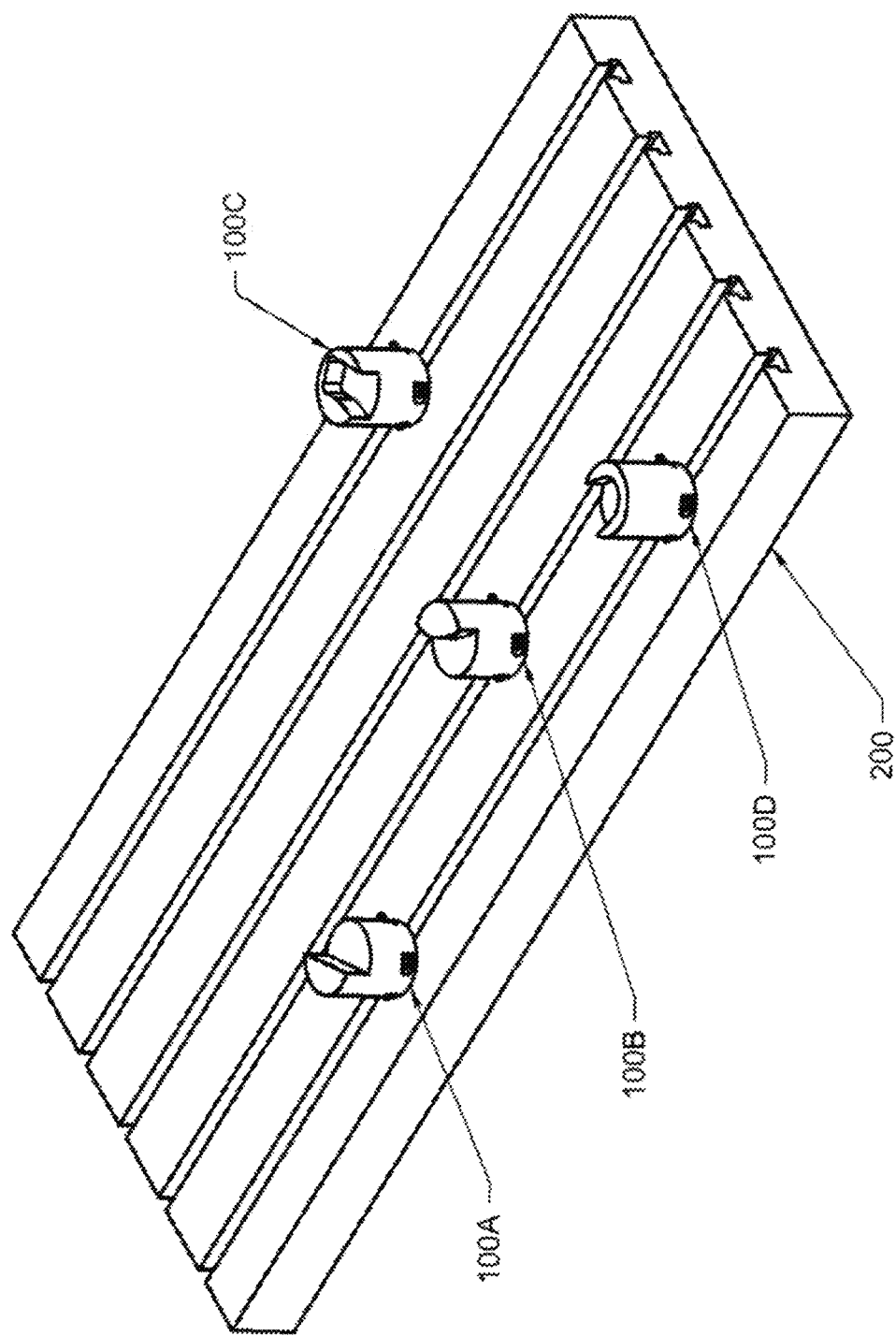
FIG. 3 is an illustration of the present invention's body.

FIG. 3 is an illustration of the present invention's body.

TableJaw body 101 is made of a material that is readily machinable, such as, but not limited to, soft steel, aluminum, plastic, wood, etc. Body 101 is normally uniform in dimension and shape throughout that cross-section that is orthogonal to the z-axis. In best practice, body 101 is generally circular in this cross-section. TableJaw body 101 includes three surfaces, the top body surface 102, the side body surface 103, and the bottom body surface 104. Top body surface 102 and bottom body surface 104 are parallel to one another and are mutually orthogonal to the side body surface 103. Cavity 110 is machined into the bottom body surface 104 of the TableJaw body 101 to receive the clamping insert 140 (not shown in this view), and the optional bolt head of the bolt and nut combination 121, 122, or the heads of bolts 160A, B, C, D, shown in FIG. 1. Cavity 110 is machined orthogonal to the z-axis of body 101. Near the bottom body surface 104 of body 101, there are two parallel clamping pin receiver holes 130, 131 that extend through the side body surface 103 of body 101. Furthermore, the two parallel clamping pin receiver holes 130, 131 are machined parallel to opposite edges of cavity 110 that is machined into the bottom body surface 104 of body 101. The two parallel clamping pin receiver holes 130, 131 are counter-bored to create a flat surface that serves as a stop for the c-rings 155A, B, C, D that are part of the clamping pin assembly 150A, B, shown in FIG. 1. The top body surface 102 can be machined in order to create a cavity that conforms to at least a portion of the surface profile of the workpiece (not shown in this view). Optionally, body 101 can be drilled and tapped so other clamps (not shown), such as, but not limited to a Mitee-Bite clamping product, to secure the workpiece to body 101 of the TableJaw assembly 100.

FIG. 4 is an illustration of the present invention's clamping insert.

The clamping insert 140 is made of a material that is readily machinable, such as, but not limited to, soft steel, aluminum, plastic, etc. Clamping insert 140 includes surfaces bottom mounting plate surface 141, side mounting plate surface 142, top mounting plate surface 143, side upper surfaces 144A, B, side upper locking cam surfaces 145A, B, and top upper locking surface 146.

Top mounting plate surface 143, includes thru holes 148A, B, C, D that are machined orthogonal to the top mounting plate surface 143 and bottom mounting plate surface 141. Thru holes 148A, B, C, D, are counter-bored, and machined 90 degrees apart radially from the center of the clamping insert 140. Thru holes 148A, B, C, D are used to engage optional bolts 160A, B, C, D, shown in FIG. 1. Optional bolts 160A, B, C, D as illustrated in FIG. 1 securely locate and affix clamping insert 140 to a fixture plate or a tombstone (not shown in this view), etc. Center thru hole 149 is machined thru the center of the top upper locking surface 146, and is counter-bored. Center thru hole 149 is machined orthogonal to the top upper locking surface 146 and bottom mounting plate surface 141. The optional bolt 121 as illustrated in FIG. 1 contacts the center thru hole 149 counter-bore surface in order to secure the clamping insert 140 to a machine tool table bed. The optional nut 122 (as illustrated in FIG. 4), which is a part of the optional bolt and nut combination 121, 122 (as illustrated in FIG. 1), contact the bottom side of a machine tool table bed (not shown in this view) in order to create the necessary clamping force when tightened to securely hold TableJaw assembly 100 (not shown in this view) in place. The upper side locking cam surfaces 145A, B are machined with lip surfaces 199A, B that protrude respectively over the upper side locking cam surfaces 145A, B. Upper lip surface 199A, 199B is designed to engage the cam shape machined into the clamping pin assembly 150A, B cam pins 151A, B as illustrated in FIG. 1.

Optionally, locator pins 170A, B as illustrated in FIG. 1 may be driven into locator pin holes 180A, B that are machined into the mounting plate portion of the clamping insert 140. The locator pin holes 180A, B are machined orthogonally to top mounting plate surface 143 and bottom mounting plate surface 141.

Figure 5:
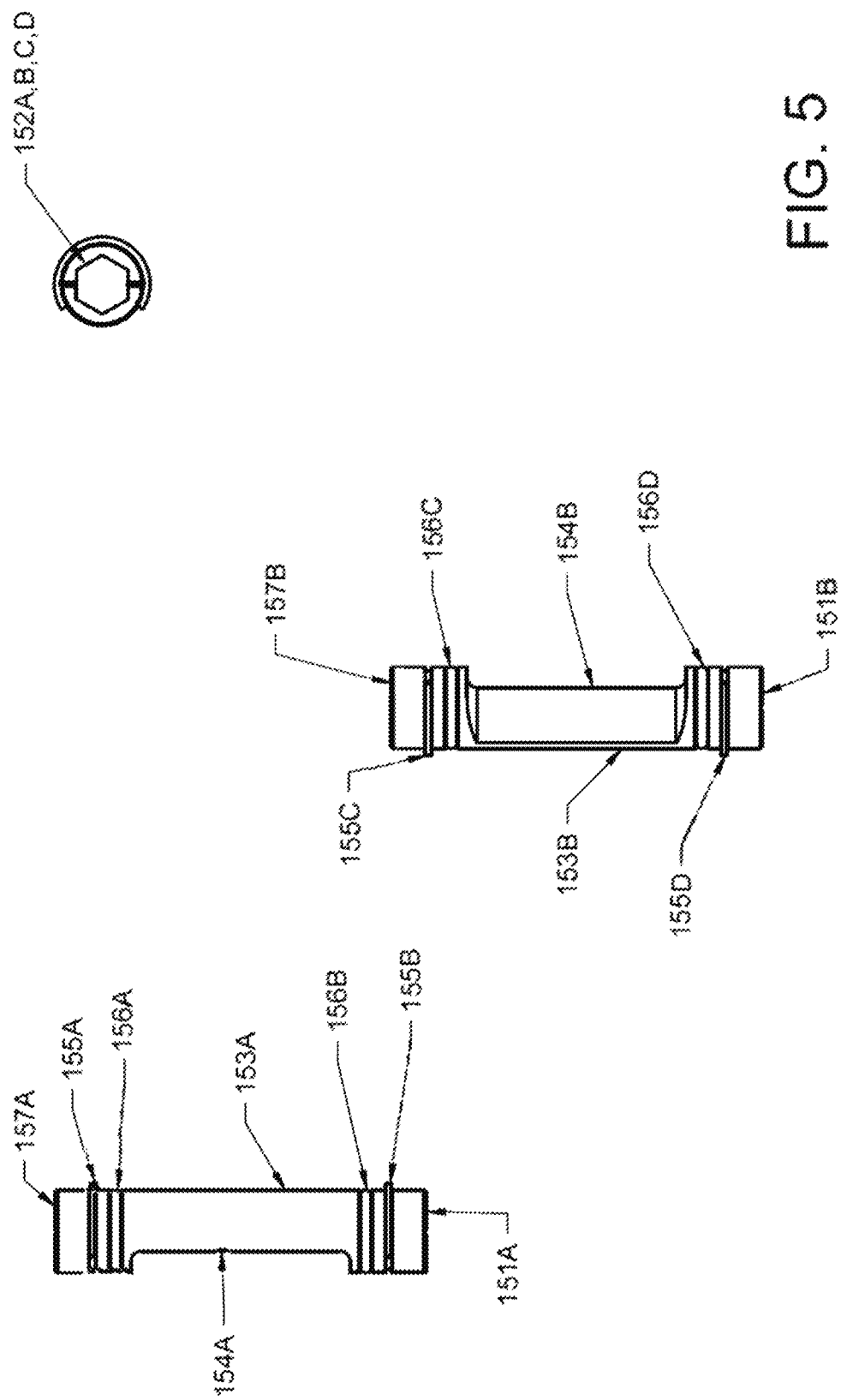
FIG. 5 is an illustration of the present invention's clamping pin assemblies.

FIG. 5 is an illustration of the clamping pin assemblies.

The clamping pin assemblies 150A, B are generally circular in cross-section throughout the long axis of the assembly. Cam pins 151A, B include end cam pin surface with milled Allen wrench head 152A, B, outer cam pin surface 153A, B, cam pin cam surface 154A, B, and end cam pin surface 157A, B. Outer cam pin surface 153A, B have grooves for o-rings 156A, B, C, D and c-rings 155A, B, C, D, and are machined orthogonally to the long-axis of cam pin assemblies 150A, B. As cam pin assemblies 151A, B are rotated the cam pin cam surface 154A, B engage the upper lip surface 199A, B of clamping insert 140 which respectively protrude over the upper side locking cam surfaces 145A, B as illustrated in FIG. 1 and FIG. 4. When the cam pin cam surface 154A, B is locked into place, the necessary clamping force is created to hold the present invention solidly in place on a machine tool table bed (not shown in this view), a fixture plate (not shown in this view), or a tombstone (not shown in this view), etc. As the clamping pins are rotated, the bolt and nut combination 121, 122 as illustrated in FIG. 1 inserted thru the clamping insert 140 as illustrated in FIG. 1 is put into tension, which also helps create the necessary clamping force to securely located the TableJaw assembly 100 (not shown in this view) to the machine tool table bed (not shown in this view). The clamping pin assemblies 150A, B bear down on the lower surfaces of the two parallel clamping pin receiver holes 130, 131 as illustrated in FIG. 1 that extends through side body surface 103 of the TableJaw body 101 near the bottom body surface 104 (as illustrated in FIG. 3).

Figure 6:
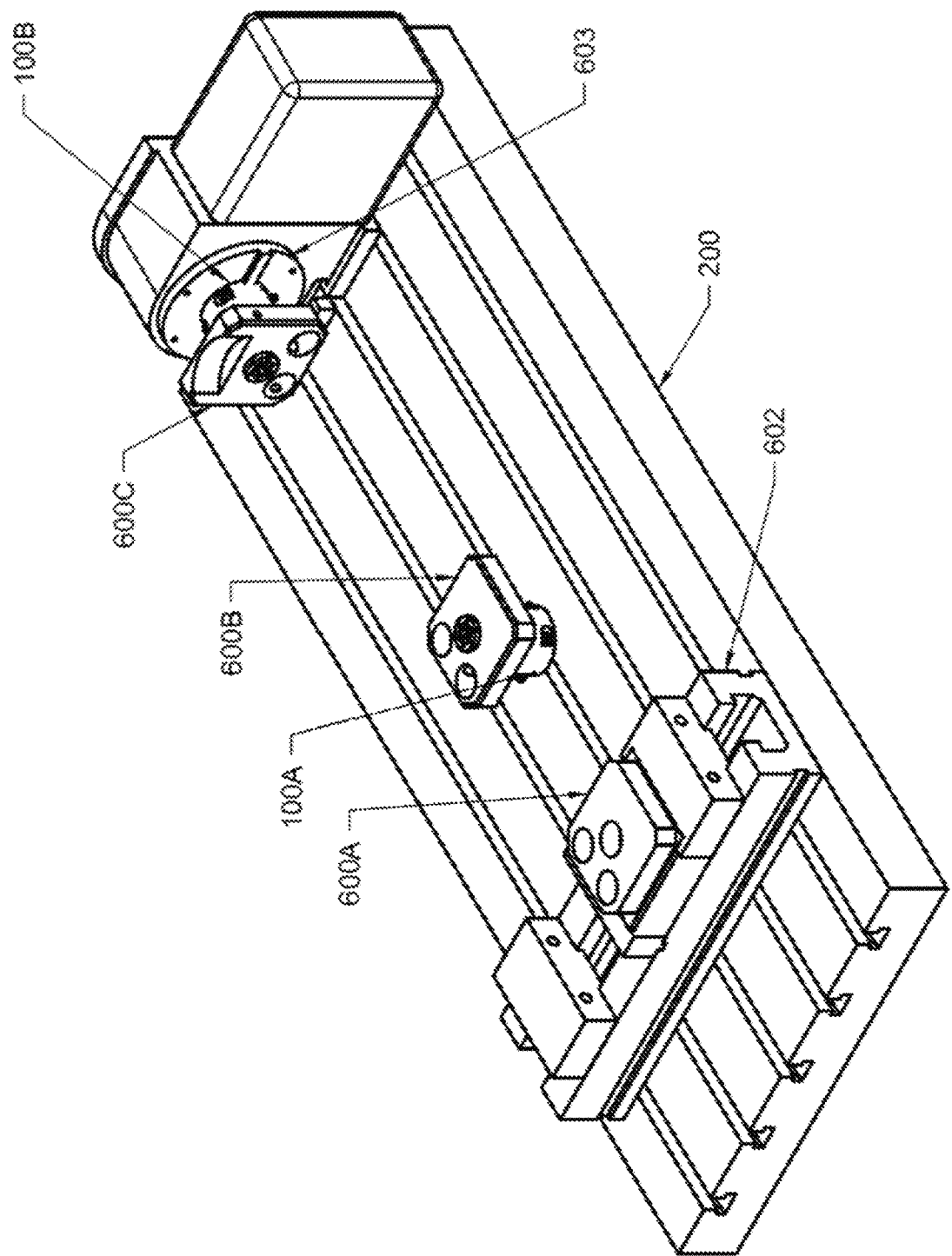
FIG. 6 is an illustration of a plurality of the present invention's TableJaws being used in a multi-operation set-up in a machine tool.

FIG. 6 is an illustration of a plurality of the present invention's TableJaw assemblies 100A. B being used in a multi-operation set-up in a machine tool.

In this illustration, TableJaw assemblies 100A, B, each respectively with fixture plates 600A. 600B, 600C are strategically located for a multi-operation set-up on the machine tool table bed 200, vise 602, and tombstone 603.

Figure 7:
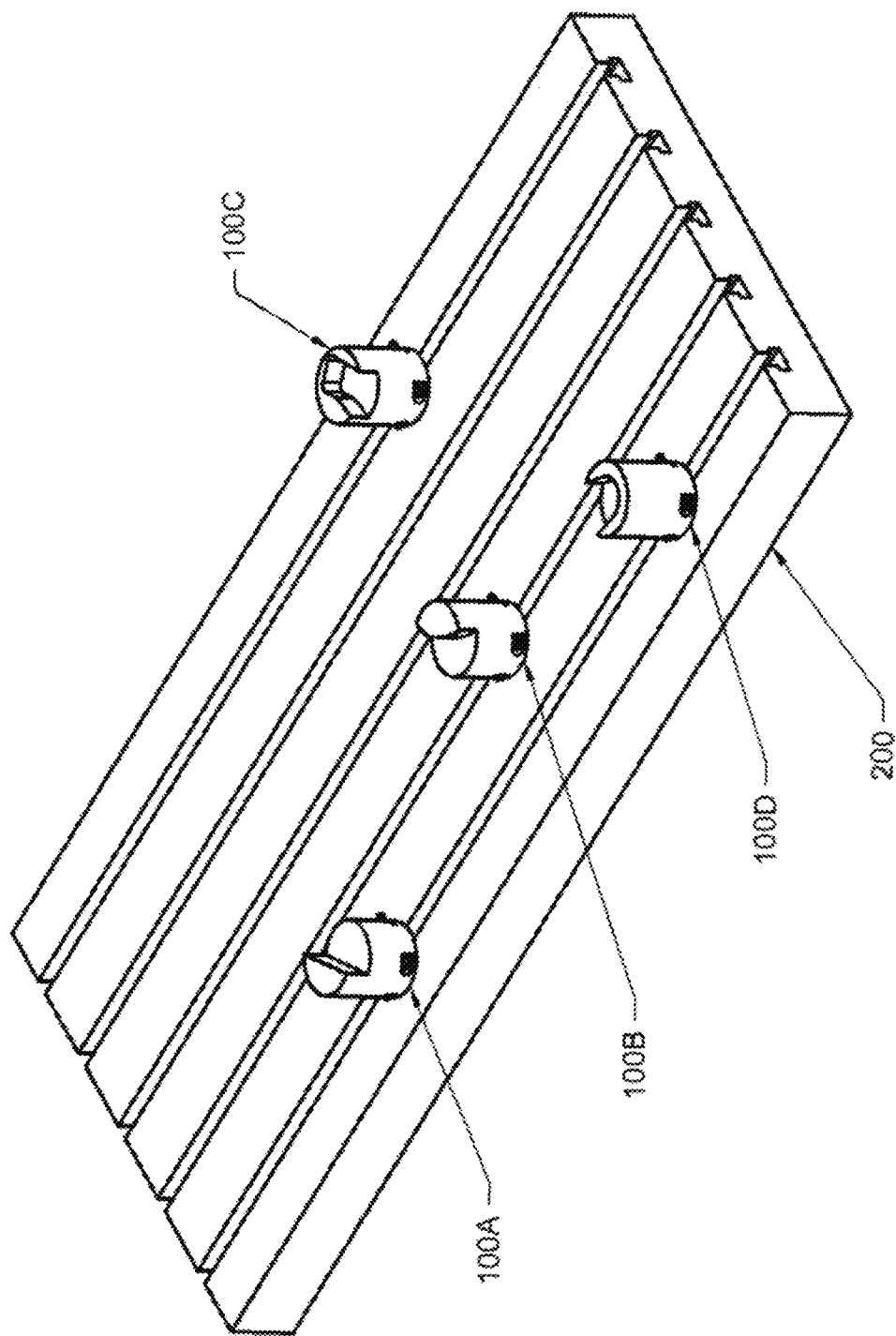
FIG. 7 is an illustration of a plurality of the present invention's TableJaws mounted to a machine tool table bed, ready to receive a workpiece.

FIG. 7 is an illustration of a plurality of the present invention's TableJaws mounted to a machine tool table bed, ready to receive a workpiece.

Four TableJaw assemblies 100A, B, C, D are shown secured to table bed 200. Each TableJaw body 101 (as illustrated in FIG. 3) has been configured to receive a portion of a workpiece that is to be machined. The workpiece is illustrated in FIG. 8.

Figure 8:
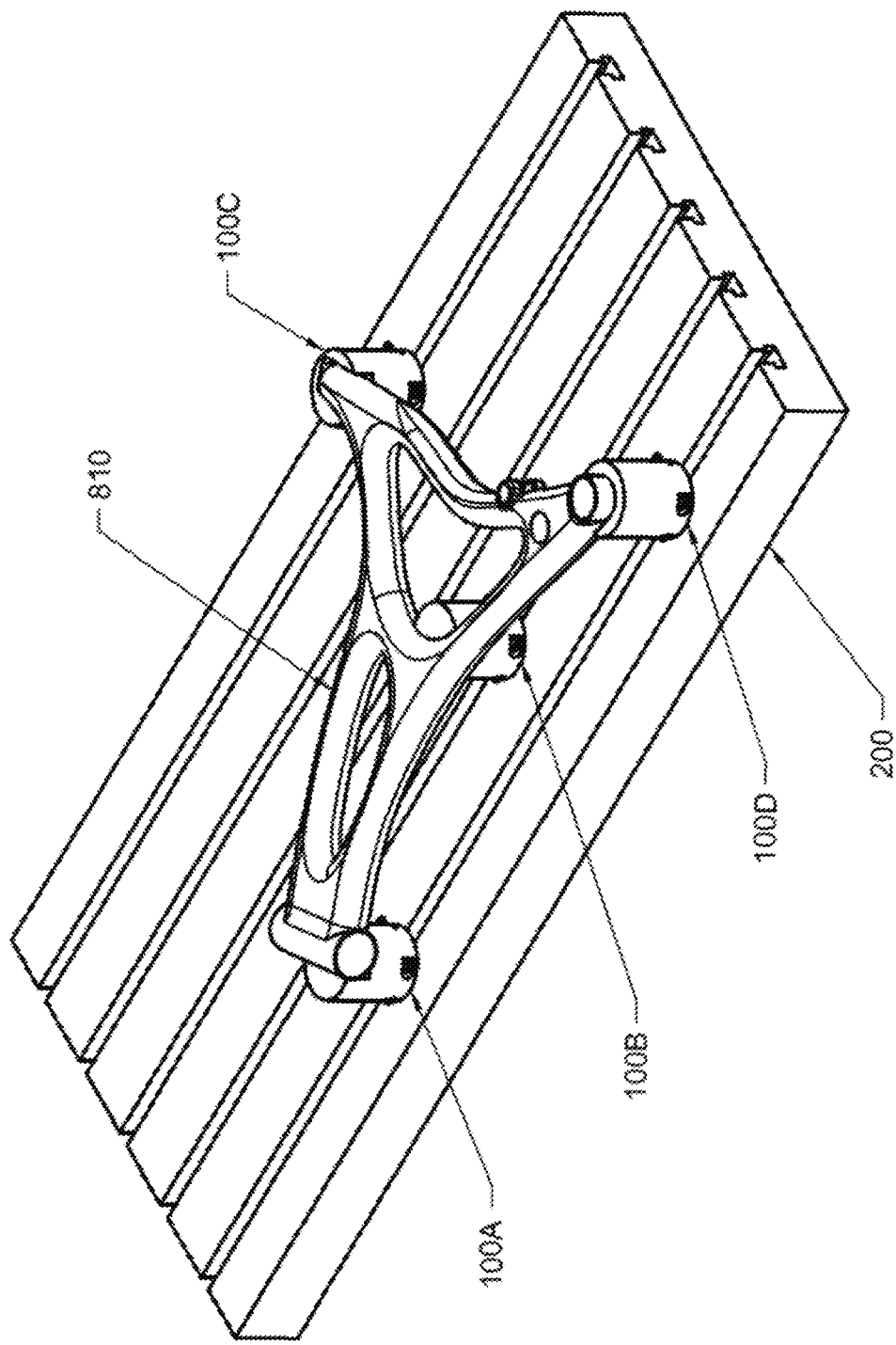

FIG. 8 is an illustration of a workpiece placed in the plurality of TableJaws shown in FIG. 7.

The four Table assemblies 100A, B, C, D which are illustrated in FIG. 7 are shown securing the workpiece, which is a bicycle frame 810, to table bed 200.

Figure 9:
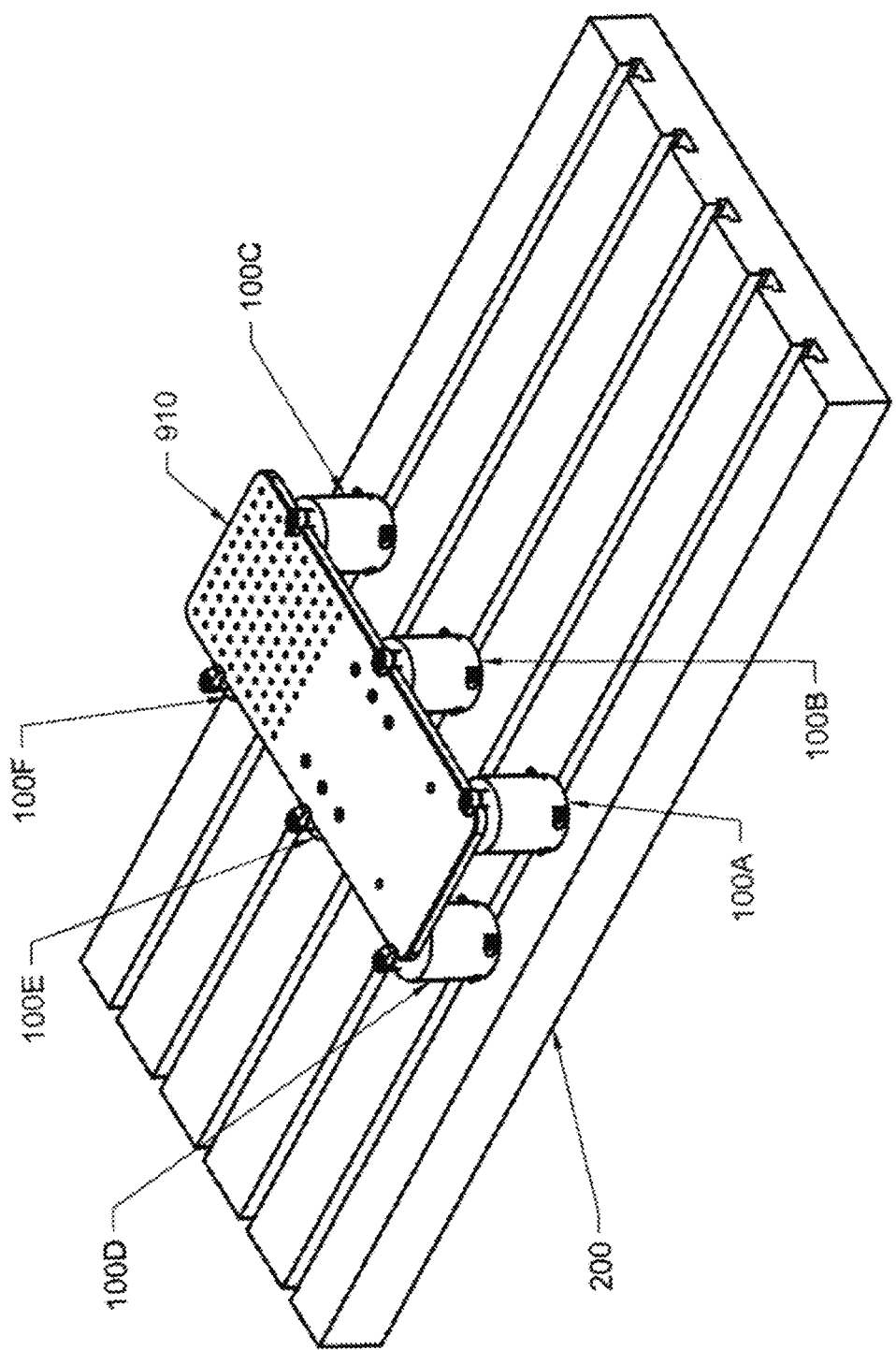
FIG. 9 is an illustration of a multiplicity of the present invention's TableJaws being used as riser blocks for a workpiece secured to a machine tool table bed.

FIG. 9 is an illustration of a multiplicity of the present invention's TableJaw assemblies 100A, B, C, D, E, F are being used to support and secure workpiece 910 to a machine tool table bed, 200.

Figure 10:
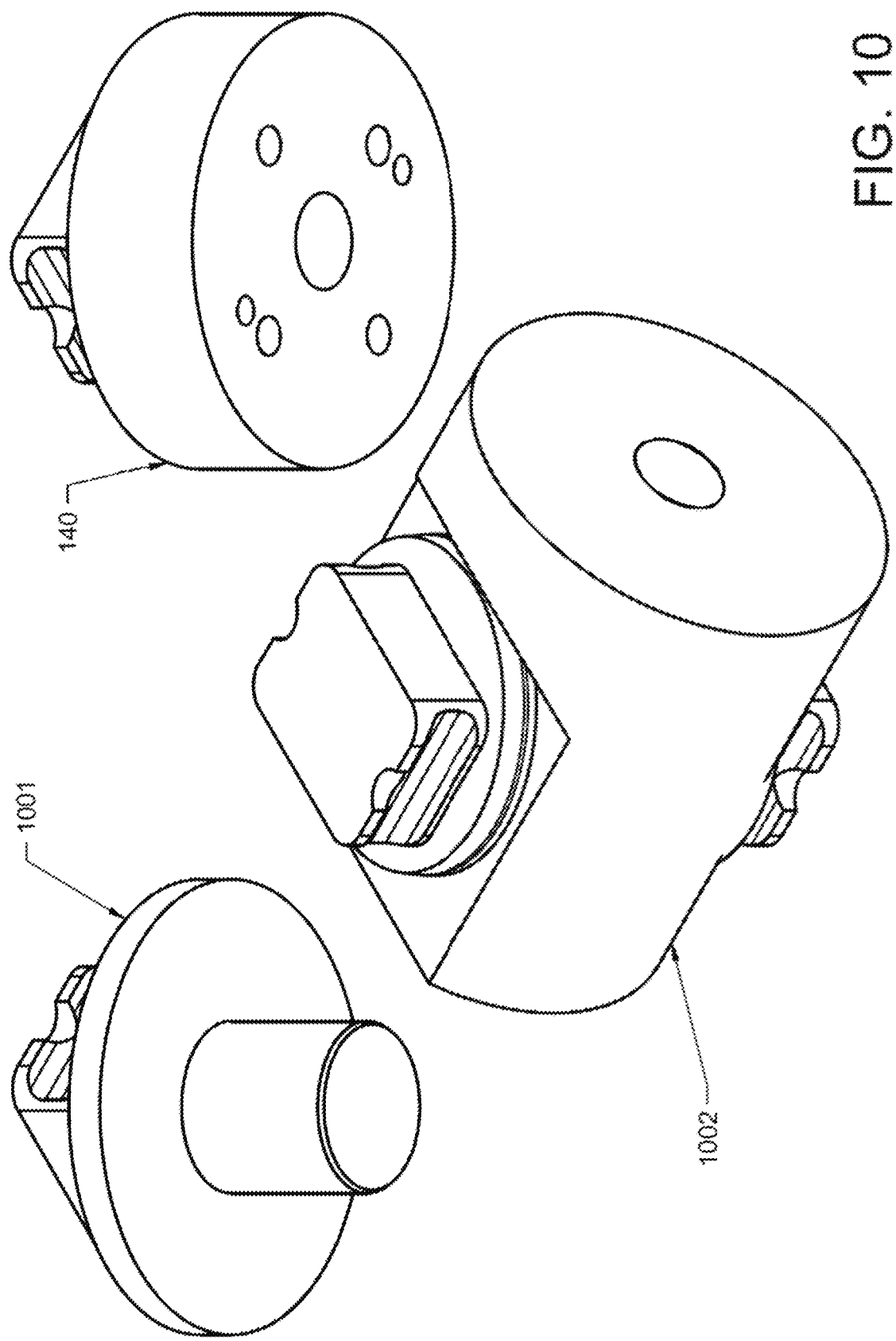
FIG. 10 is an illustration of alternative TableJaw clamping inserts.

FIG. 10 is an illustration of an alternative clamping inserts 1001, 1002, 140. Clamp insert 1001 includes an integrated shaft. The integrated shaft can be gripped to hold the TableJaw assembly 100 (as illustrated in FIG. 1) securely in place.

Clamping insert 1002 illustrates a configuration in which there are two integrated clamping inserts 140 are located on a different plane. This is useful for doing $4^{th}$ axis machining.

Clamping insert 140 is shown with a thicker base. All other features are the same as shown in FIG. 4.

FIG. 11 is an illustration of alternative TableJaw bodies. TableJaw bodies 101 are configured the same as shown in FIG. 3, except in FIG. 11 one is shown with a larger diameter, and the second is shown a larger height.

Alternative TableJaw body 1101 is shown in a square body configuration.

Alternative TableJaw body 1102 is shown in an octagonal body configuration.

Figure 12:
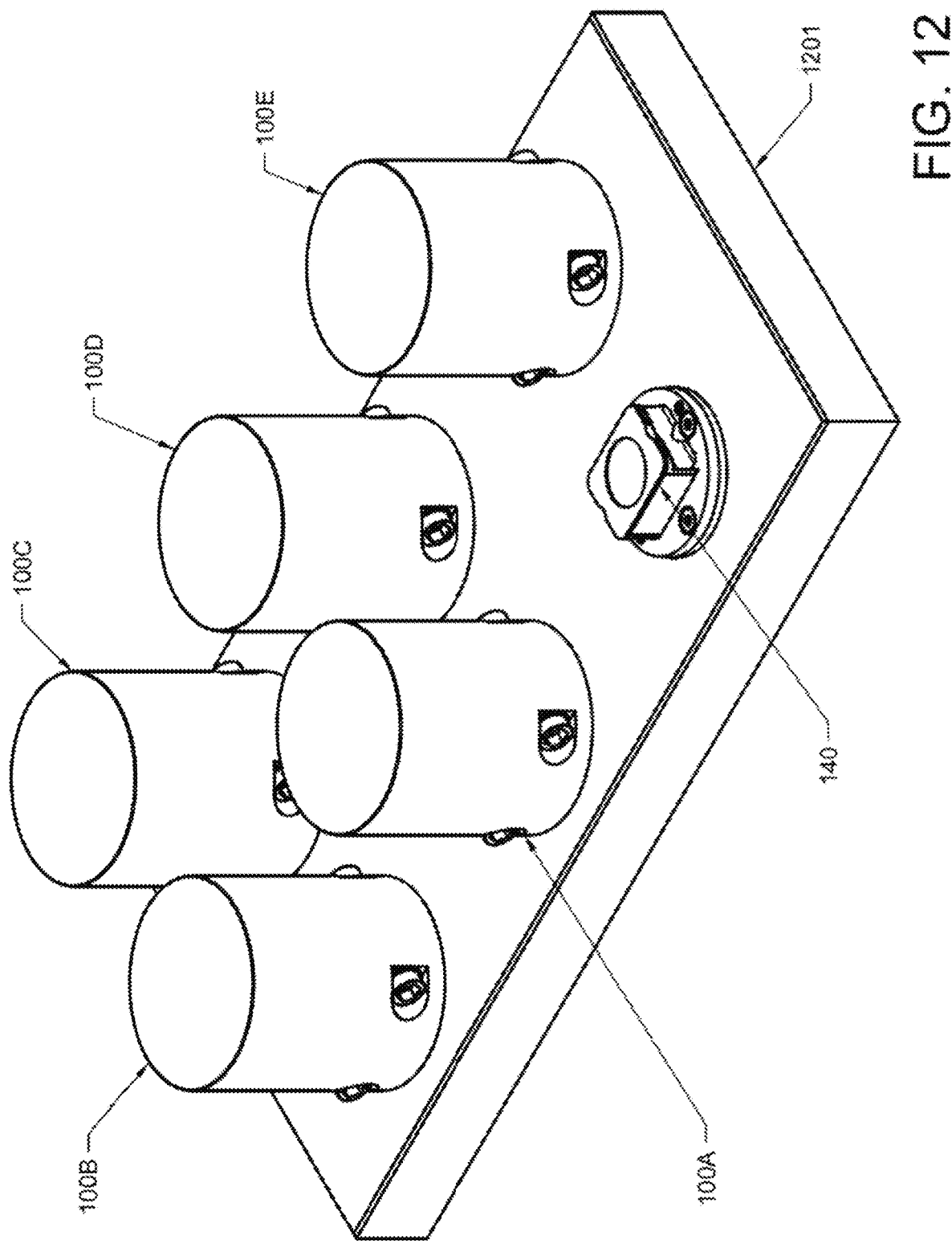
FIG. 12 is an illustration of a plurality of the present invention's assemblies mounted on a fixture plate.

FIG. 12 is an illustration of a plurality of TableJaw assemblies 100A, B, C, D, E mounted on fixture plate 1201. Also, a clamping insert 140 is shown mounted to fixture plate 1201.

The benefits and features of the present invention include, but are not limited to, the following:

The TableJaw assembly 100 is configured to provide a soft jaw clamping device for securely holding a workpiece in a machine tool as illustrated in the various FIGs.

The TableJaw assembly 100 is configured to provide a soft jaw clamping device for securely holding a workpiece in a machine tool that can be attached to a table bed as illustrated in the various FIGs.

The TableJaw assembly 100 is configured to provide a soft jaw clamping device for securely holding a workpiece in a machine tool to a fixture plate as illustrated in the various FIGs.

The TableJaw assembly 100 is configured to provide a soft jaw clamping device for securely holding a workpiece in a machine tool to a tombstone as illustrated in the various FIGs.

The TableJaw assembly 100 is configured to provide a soft jaw clamping device for securely holding a workpiece in a machine tool that is modular as illustrated in the various FIGs.

The TableJaw assembly 100 is configured to provide a soft jaw clamping device for securely holding a workpiece in a machine tool that is easy to use as illustrated in the various FIGs.

The TableJaw assembly 100 is configured to provide a soft jaw clamping device for securely holding a workpiece in a machine tool that is fast to set-up as illustrated in the various FIGs.

The TableJaw assembly 100 is configured to provide a soft jaw clamping device for securely holding a workpiece in a machine tool that allow for accurate location in a machine tool as illustrated in the various FIGs.

The TableJaw assembly 100 is configured to provide a soft jaw clamping device for securely holding a workpiece in a machine tool that can be used as a workpiece stop as illustrated in the various FIGs.

The TableJaw assembly 100 is configured to provide a soft jaw clamping device for securely holding a workpiece in a machine tool that can be used for workpiece support as illustrated in the various FIGs.

The TableJaw assembly 100 is configured to provide a soft jaw clamping device for securely holding a workpiece in a machine too that can be used as a riser block as illustrated in the various FIGs.

The TableJaw assembly 100 is configured to provide a soft jaw clamping device for securely holding a workpiece in a machine tool that can be used as a fixture clamp mount as illustrated in the various FIGs.

The TableJaw assembly 100 is configured to provide a soft jaw clamping device for securely holding a workpiece in a machine tool that can be used as a workpiece mount as illustrated in the various FIGs.

The TableJaw assembly 100 is configured to provide a soft jaw clamping device for securely holding a workpiece in a machine tool that can be used as a miniature pallet as illustrated in the various FIGs.

The TableJaw assembly 100 is configured to provide a soft jaw clamping device for securely holding a workpiece in a machine tool that can be used as a $4^{th}$ axis fixture as illustrated in the various FIGs.

The TableJaw assembly 100 is configured to provide a soft jaw clamping device for securely holding a workpiece in a machine tool that can be used as a $4^{th}$ axis miniature pallet as illustrated in the various FIGs.

The TableJaw assembly 100 is configured to provide a soft jaw clamping device for securely holding a workpiece in a machine tool that can be used as a miniature vacuum table, which is not illustrated in any of the FIGs.

The TableJaw assembly 100 is configured to provide a soft jaw clamping device for securely holding a workpiece in a machine tool that can be used as a mounting mechanism for equipment such as, but not limited to, coordinate measuring machine arms, robotic arms, vices, or other equipment, which is not illustrated in any of the FIGs.

The TableJaw assembly 100 is configured to provide a soft jaw clamping device for securely holding a workpiece in a machine tool that is simple to install as illustrated in the various FIGs.

The TableJaw assembly 100 is configured to provide a soft jaw clamping device for securely holding a workpiece in a machine tool that can be attached to said machine tool using at least one method as illustrated in the various FIGs.

The TableJaw assembly 100 is configured to provide a soft jaw clamping device for securely holding a workpiece in a machine tool that is capable of accepting a variety of pads and accessories as illustrated in the various FIGs.

The TableJaw assembly 100 is configured to provide a soft jaw clamping device for securely holding a workpiece in a machine tool that is capable of keeping receivers on a worktable in known, repeatable locations as illustrated in the various FIGs.

The TableJaw assembly 100 is configured to provide a soft jaw clamping device for securely holding a workpiece in a machine tool that is capable of mounting pads to different receivers to retain and establish orientations as illustrated in the various FIGs.

The TableJaw assembly 100 is configured to provide a soft jaw clamping device for securely holding a workpiece in a machine tool that is capable of accessories to different receivers to retain and establish orientations as illustrated in the various FIGs.

The TableJaw assembly 100 is configured to provide a soft jaw clamping device for securely holding a workpiece in a machine tool that is cost-effective.

The TableJaw assembly 100 is configured to provide a soft jaw clamping device for securely holding a workpiece in a machine tool using a twisting cam lock as illustrated in the various FIGs.

Other Uses of the Present Invention

The present invention may have utility other than a modular, cam locked, machinable soft jaw to hold workpieces in place in a machine tool.

The present invention may be used to hold product in place on a portable wall at a trade show booth. The walls having horizontally spaced rails, much like a machine tool table bed. The body of the TableJaw may be machined to conform to a product, or a part, which is clamped into place in one, or more, TableJaws which are cam locked to the portable wall with horizontally spaced rails. Alternatively, the TableJaw may include a tapped hole to accommodate a screw-in shelf arm, a screw-in eye-bolt, a screw-in hook, etc.

The top surface of the TableJaw may be configured with a material that will accept pushpins. If the TableJaw is made out of a magnetic material, the TableJaws can be used as stand-offs to hold pictures or posters that have magnets affixed to their back side.

The TableJaw may serve as a decorative universal mount for curtain rods. In this case, the TableJaw might include a wood screw in place of a bolt and nut combination that is normally used to secure a TableJaw to a machine tool table bed.

Bathroom walls constructed with a layer of sheet metal behind the drywall, can be used in conjunction with TableJaws configured with a sheet metal screw, instead of the typical bolt and nut combination that is used to secure a TableJaw to a machine tool table bed. This way, the TableJaws can be screwed anywhere that is convenient in the sheet metal backer-plate, and the body of the TableJaw can be configured with tapped holes to receive toilet paper holders, mirrors, medicine cabinets, shelves, toothbrush holders, soap dishes, etc.

The TableJaw can be counter-bored. The counter-bore can be used to capture the ends of a shower curtain tension rod. This way, the walls are never marred, the tension rods can easily be changed out. The tension rods will always be secure, because the ends of the tension rods are captured with the counter-bores of two opposing TableJaws.

The TableJaw can be configured to serve as a permanent mounting point for lighting that is designed to hang on a wall, such as a sconce, or reading light, etc. The top side of the TableJaw body can be configured with a thru hole to snake wiring through, a cavity that is large enough to accommodate wiring and wire nuts, and standard screw hole locations for mounting lighting fixtures.

In any of these alternative examples, the body of the TableJaw may be easily removed and changed out to provide different functionality.

It is to be appreciated there are many uses for a modular jaw that can be configured in many shapes, sizes, materials, and colors.

Although a specific preferred embodiment of the invention has been described, it is recognized that variations and alternatives may readily occur to those skilled in the art. It is accordingly intended that the appended claims be interpreted to include all alternatives and equivalents falling within the spirit of the invention.

What is claimed is:

1. An apparatus for securely holding a workpiece in a machine tool comprising:
   a body having cross-sections characterized by a two-dimensional shape orthogonally oriented to a central axis traversing a height of the body, said body having a cavity located therewithin;
   a clamping insert that can be inserted into the cavity such that the body and the clamping insert are coaxial about the central axis, said cavity having a cross-section characterized by a two-dimensional shape that matches the cross-sections of the body;
   an integral cam lock lip fastened to the machine tool with a fastener; and
   at least one cam operated locking pin traversing thru an elongated hole in the body, said elongated hole having a long axis orthogonally oriented to the central axis;
   wherein the at least one cam operated locking pin engages the cam lock lip of the clamping insert when the at least one cam operated locking pin is rotated until the at least one cam operated locking pin stops; and
   wherein engagement between the at least one cam operated locking pin and the cam lock lip of the clamping insert is bolstered by use of c-rings and o-rings that fit into grooves machined into an outer surface of the at least one cam operated locking pin.

2. The apparatus of claim 1 wherein the fastener comprises at least one hold-down bolt and a nut.

3. The apparatus of claim 1 wherein the fastener is a wood screw.

4. The apparatus of claim 1 wherein the fastener is a sheet metal screw.

5. The apparatus of claim 1 wherein a finish of the body is selected from the group consisting of: natural, anodized, lacquered, painted, blasted, and stained.

6. The apparatus of claim 1 wherein a finish of the body is selected from the group consisting of: natural, anodized, lacquered, painted, blasted, and stained.

7. A system comprising:
   the apparatus of claim 1; and
   a wall including horizontally spaced rails, said horizontally spaced rails being used to attach to the apparatus.

8. The system of claim 7 wherein the fastener comprises at least one hold-down bolt and a nut.

9. The system of claim 7 wherein the fastener is a wood screw.

10. The system of claim 7 wherein the fastener is a sheet metal screw.

11. The apparatus of claim 1 wherein an outer perimeter of the cross-sections of the body and the cross-sections of the clamping insert are substantially circular.

12. The apparatus of claim 11 wherein, when the apparatus is in a locked position, the body, the clamping insert, and the fastener are concentrically oriented.

13. The apparatus of claim 1 wherein the at least one cam operated locking pin comprises two cam operated locking pins traversing thru two elongated holes in the body machined into a base portion of the body parallel to opposite edges of the clamping insert cavity.

14. The apparatus of claim 1 wherein the fastener extends through a center thru hole in the clamping insert.

15. The apparatus of claim 14 wherein the clamping insert further comprises outer thru holes radially and symmetrically arrayed about the central axis through which additional fasteners can help secure the clamping insert to the body.

16. A method of securely holding a workpiece in a machine tool comprising:
   providing the apparatus of claim 1, wherein the clamping insert further includes an integral cam lock lip;
   fastening the clamping insert to the machine tool with the fastener and the integral cam lock lip.

17. An apparatus for securely holding a workpiece in a machine tool comprising:
- a body having cross-sections characterized by a two-dimensional shape orthogonally oriented to a central axis traversing a height of the body, said body having a cavity located therewithin;
- a clamping insert that can be inserted into the cavity such that the body and the clamping insert are coaxial about the central axis, said cavity having a cross-section characterized by a two-dimensional shape that matches the cross-sections of the body;
- an integral cam lock lip fastened to the machine tool with a fastener; and
- at least one cam operated locking pin traversing thru an elongated hole in the body, said elongated hole having a long axis orthogonally oriented to the central axis;
- wherein the at least one cam operated locking pin engages the cam lock lip of the clamping insert when the at least one cam operated locking pin is rotated until the at least one cam operated locking pin stops;
- wherein engagement between the at least one cam operated locking pin and the cam lock lip of the clamping insert is bolstered by use of c-rings and o-rings that fit into grooves machined into an outer surface of the at least one cam operated locking pin; and
- wherein the at least one cam operated locking pin further comprises an end cam pin surface with a milled Allen wrench head.

\* \* \* \* \*